US009105151B2

(12) United States Patent
Muir

(10) Patent No.: US 9,105,151 B2
(45) Date of Patent: *Aug. 11, 2015

(54) MULTIGAME SELECTION

(71) Applicant: Aristocrat Technologies Australia Pty Limited, North Ryde (AU)

(72) Inventor: Robert Linley Muir, Artarmon (AU)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/953,872

(22) Filed: Jul. 30, 2013

(65) Prior Publication Data

US 2013/0337896 A1  Dec. 19, 2013

Related U.S. Application Data

(63) Continuation of application No. 13/302,610, filed on Nov. 22, 2011, now Pat. No. 8,506,403, which is a continuation of application No. 10/572,930, filed as application No. PCT/AU2004/001288 on Sep. 21, 2004, now Pat. No. 8,075,402.

(30) Foreign Application Priority Data

Sep. 22, 2003 (AU) ............................... 2003905171

(51) Int. Cl.
*G07F 17/32* (2006.01)
*A63F 13/30* (2014.01)

(52) U.S. Cl.
CPC .............. *G07F 17/323* (2013.01); *A63F 13/12* (2013.01); *G07F 17/32* (2013.01);

(Continued)

(58) Field of Classification Search
USPC ........................... 463/25–42; 273/191, 138 R
See application file for complete search history.

(56) References Cited

U.S. PATENT DOCUMENTS 4,636,951 A  1/1987 Harlick
5,630,753 A  5/1997 Fuchs (Continued)

FOREIGN PATENT DOCUMENTS

AU  775198  4/2001
BE  1014377  9/2003

(Continued)

OTHER PUBLICATIONS

Examiner's first report for Australian Patent Application No. 2004273540, dated Apr. 28, 2009.

(Continued)

*Primary Examiner* — Masud Ahmed
(74) *Attorney, Agent, or Firm* — McAndrews, Held & Malloy, Ltd.

(57) ABSTRACT

A gaming system comprises a gaming server, a plurality of gaming machines, and a communications system connecting each of the plurality of gaming machines to the gaming server. The gaming machines each have a display, player controls, a player tracking device, and a game processor which displays sequential game images of a game being played. Each game processor plays a game initiated by the player, where the game is one of a plurality of games available on the gaming machine and selectable by the player. Each gaming machine includes game selection means which displays a selection of games available on the machine for the player to play. The games offered for selection are ordered according to a ranking determined as a function of the player's past history of playing games and a history of games played by other players.

19 Claims, 8 Drawing Sheets

(52) U.S. Cl.
CPC ....... *G07F 17/3237* (2013.01); *G07F 17/3239* (2013.01); *G07F 17/3262* (2013.01); *A63F 2300/308* (2013.01); *A63F 2300/535* (2013.01); *A63F 2300/5546* (2013.01)

(56) References Cited

U.S. PATENT DOCUMENTS

| | | | |
|---|---|---|---|
| 5,989,121 | A | 11/1999 | Sakamoto |
| 6,264,560 | B1 | 7/2001 | Goldberg et al. |
| 6,270,409 | B1 | 8/2001 | Shuster |
| 6,695,697 | B1 | 2/2004 | Okada |
| 7,465,232 | B2 | 12/2008 | Okada |
| 2001/0036857 | A1 | 11/2001 | Mothwurf et al. |
| 2002/0094863 | A1 | 7/2002 | Klayh |
| 2002/0142846 | A1 | 10/2002 | Paulsen |
| 2003/0078101 | A1 | 4/2003 | Schneider et al. |
| 2004/0002386 | A1 | 1/2004 | Wolfe et al. |
| 2004/0117831 | A1 | 6/2004 | Ellis et al. |
| 2004/0209690 | A1 | 10/2004 | Bruzzese et al. |

FOREIGN PATENT DOCUMENTS

| | | |
|---|---|---|
| EP | 0360613 | 1/1995 |
| EP | 1041525 | 10/2000 |
| EP | 1079344 | 2/2001 |
| EP | 1437876 | 7/2004 |
| GB | 2378664 | 2/2003 |
| WO | 0199067 | 12/2001 |
| WO | 03025828 | 3/2003 |

OTHER PUBLICATIONS

International Search Report corresponding to International Application No. PCT/AU2004/001288, mailed Nov. 30, 2004.

MULTIGAME SELECTION

CROSS-REFERENCE TO RELATED APPLICATIONS

The present patent application is a continuation of U.S. patent application Ser. No. 13/302,610, filed Nov. 22, 2011, which is a continuation of U.S. patent application Ser. No. 10/572,930, filed Mar. 22, 2006, now U.S. Pat. No. 8,075,402, issued Dec. 13, 2011, which is a 371 filing of International Application PCT/AU2004/001288, filed Sep. 21, 2004, which claimed priority to AU Provisional Application 2003905171, filed on Sep. 22, 2003. The present patent application incorporates the above identified applications by reference in their entirety.

INTRODUCTION

The present invention relates generally to the field of gaming and in particular the invention provides an improved method of game selection in a multigame environment.

BACKGROUND OF THE INVENTION

A player in a casino is presented with a choice from among potentially hundreds of gaming machines. Players develop a preference certain games from among all the ones available, and try various machines to find the ones they like. Given this large choice it can be difficult for a player to find games they like to play.

Multi-game machines offer more than one game on a single electronic gaming machine (EGM). This can dramatically increase the choices available to players, but makes it more difficult for the player to identify games that they like amongst the many games provided. As technology progresses and multi-game machines become more capable the number of games will increase even further as manufacturers entire game libraries could potentially become available on a single machine. Internet gaming web sites have the same problem, with many games available via the one gaming terminal (eg a home computer).

Gaming machines in a Casino are often networked for the purposes of security, accounting, credit transfer, bonusing, and for player marketing. These systems typically track players using a magnetic card that the player inserts into the gaming machine, the magnetic card being associated with a player account on a central server. U.S. Pat. No. 4,636,951 (Harlick) shows a system for networking gaming machines to provide a credit transfer mechanism between machines and a central cashier station.

U.S. Pat. No. 5,655,961 (Acres) shows a bonusing system, in which player tracking is provided via a magnetic card carried by a player and which the player inserts into a magnetic card reader in a gaming machine to identify the player to the machine and/or the entire system.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

According to a first aspect, the present invention consists in a gaming system including gaming server, a plurality of gaming machines, and a communications system connecting each of the plurality of gaming machines to the gaming server, the gaming machines each having display means, player input means, player tracking input means and game control means arranged to control images displayed on the respective display means, each game control means being arranged to play a game initiated by the player, the game being one of a plurality of games available on the gaming machine and selectable by the player and the game having a game result which, if it is a winning result, will cause the game control means to award a prize to the player, the gaming system being characterised in that each gaming machine includes game selection means which displays a selection of games available on the machine for the player to play, the selection being ordered according to a ranking determined as a function of the player's past history of playing games and a history of games played by other players.

According to a second aspect, the present invention consists in a gaming machine connected to a gaming system wherein the gaming system comprises a gaming server, a plurality of said gaming machines, and a communications system connecting each of the plurality of gaming machines to the gaming server, the gaming machine having display means, player input means, player tracking input means and game control means arranged to control images displayed on the respective display means, the game control means being arranged to play a game initiated by the player, the game being one of a plurality of games available on the gaming machine and selectable by the player and the game having a game result which, if it is a winning result, will cause the game control means to award a prize to the player, the gaming machine being characterised in that it includes game selection means which displays a selection of games available on the machine for the player to play, the selection being ordered according to a ranking determined as a function of the player's past history of playing games and a history of games played by other players.

According to a third aspect, the present invention consists in a gaming machine, the gaming machine having display means, player input means, player tracking input means and game control means arranged to control images displayed on the respective display means, the game control means being arranged to play a game initiated by the player, the game being one of a plurality of games available on the gaming machine and selectable by the player and the game having a game result which, if it is a winning result, will cause the game control means to award a prize to the player, the gaming machine being characterised in that it includes game selection means which displays a selection of games available on the machine for the player to play, the selection being ordered according to a ranking determined as a function of the player's past history of playing games and a history of games played by other players.

According to a fourth aspect, the present invention consists in a game recommendation display device connected to a gaming system, the game recommendation display device comprising a computational device, having a display means and a player input, the device being characterised in that it includes game selection means which displays a selection of games available on the system for the player to play, the selection being ordered according to a ranking determined as a function of the player's past history of playing games and a history of games played by other players.

The selection means orders the selection of games according to the players past history of games played on the current machine in the current playing session only.

The selection means may order the selection of games according to the players past history of games played on any machine in the system in the current session and any previous session. The selection means may also order the selection of games according to the past history of games played by others on the current machine. Further, the selection means may order the selection of games according to the past history of games played by others on any machine in the system.

The selection of games and their order of representation is preferably made by a recommendation engine either located in the gaming machine or on a server connected to the network to which the gaming machine is connected. The recommendation engine preferably collects data on the playing habits of all distinguishable individuals determined by the system (that is individuals for whom the same individual can be linked to a plurality of game plays). The player data is processes to determine the most popular games and the groups of games that are popular with particular individuals. For each game in the system, the processed data results in a list of other games that would be of similar enjoyment value to the player.

According to a fifth aspect, the present invention consists in a gaming machine, the gaming machine having display means, player input means and game control means arranged to control images displayed on the respective display means, the game control means being arranged to play a game initiated by the player, the game being one of a plurality of games available on the gaming machine and selectable by the player and the game having a game result which, if it is a winning result, will cause the game control means to award a prize to the player, the gaming machine being characterised in that it includes game selection means which displays a plurality of game categories, each game category associated with one or more of the plurality of games available on the gaming machine and is responsive to the selection of a category by the player to display a list of games with which the selected category is associated.

The available games are preferably split into a number of categories according to common player preferences and presented to the player in a selection window. The categories may include games with high wins, games with frequent wins, older (traditional) games, card games, slot games, and currently popular games. The same game may appear in more than one category. The player will typically select a category by touching an associated button. Preferably the button is a pseudo-button on a touch sensitive video screen display but it may also be a button of a conventional switch.

Preferably one of the categories is a recommended games category and is associated with a selection of games determined as a function of the player's past history of playing games and a history of games played by other players to be games that are likely to be games the player would select.

Within each category the games may be further ordered, either with sub-categories or if multiple pages of games exist then according to the page number.

In a refinement of this arrangement the list of games displayed for selection by the player are generated according to a set of filters where each is arranged to select games in a particular category. Each game is assigned one or more tags indicating a category with which the game is associated, and the presence of the tag in respect of a game is used by the filter to select the game for inclusion on the displayed games list. For example a game may be 'high win' and 'popular'. If the player selects either (or both) 'high win' and 'popular' filters then this game will appear in the selection. If another filter, such as "frequent win", is selected the game will not appear in the selection list as it does not have a frequent win tag. Preferably each filter is represented by a button and the filters are toggled on and off by selecting the filter button. Some filters may disable other filters when selected, if the categories are mutually exclusive. The "high wins" and "frequent wins" categories are likely to be mutually exclusive as it is not possible to design a game with frequent high wins without returning to the player more money than they bet.

In an further preferred embodiment, the number of categories displayed to the player is a subset of those available, and the categories displayed can be selected by the player from the total set. Alternately the categories are dynamically selected by the gaming machine and/or system according to players playing history.

The categories of games and/or games in each category may be changed dynamically, either manually or according to pre-programmed criteria such as time of day or number gaming machines in play. The command to change the games may be initiated from within the gaming machine or remotely from network control system.

BRIEF DESCRIPTION OF THE DRAWINGS

An embodiment of the invention is now described by way of example with reference to the accompanying diagrammatic drawings in which:—

DETAILED DESCRIPTION OF THE PREFERRED EMBODIMENTS

Figure 1:
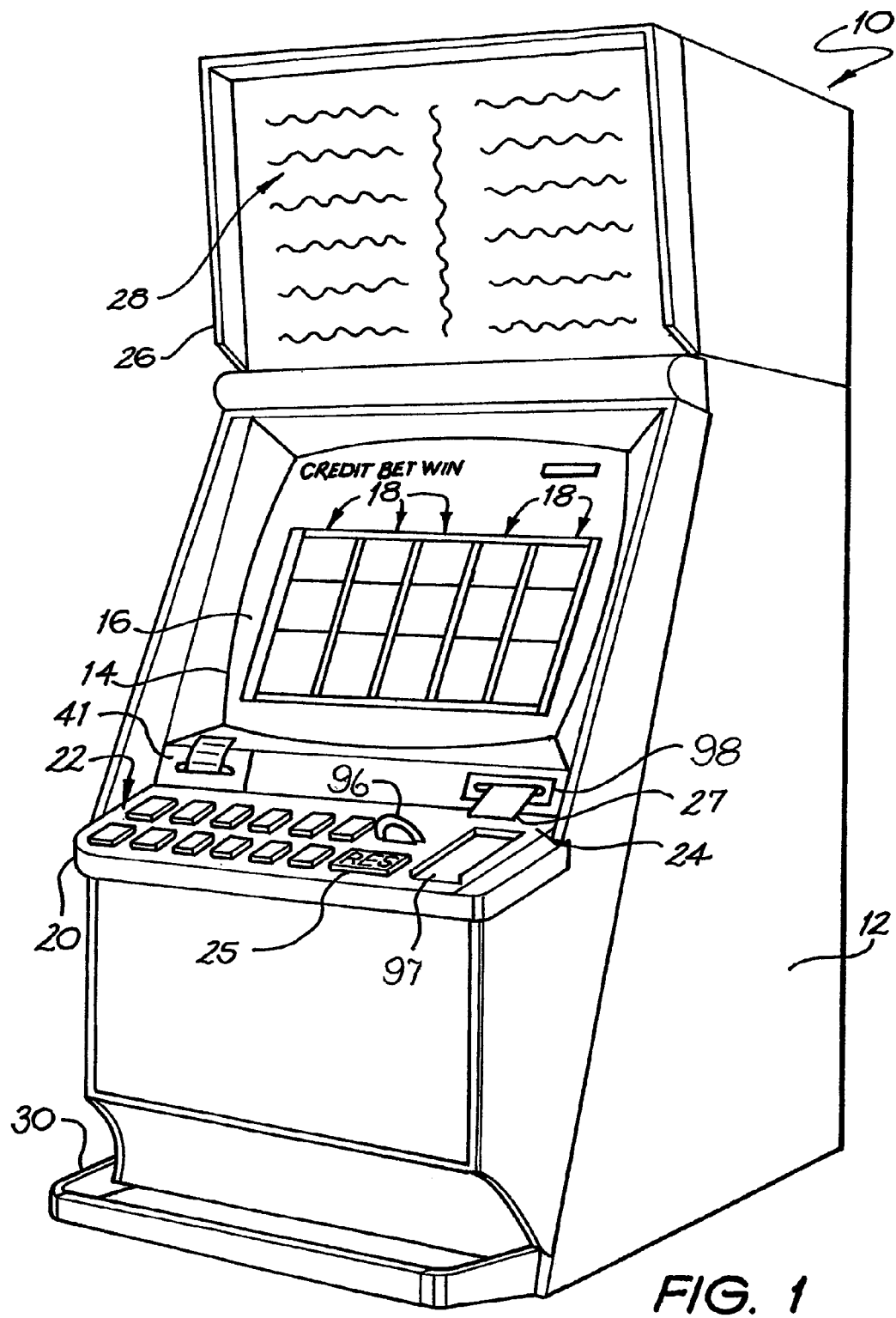
FIG. 1 shows a perspective view of a first style of gaming machine, suitable for use in systems implementing embodiments of the present invention.

Referring to FIG. 1 a typical gaming machine is illustrated of a type to which the present invention can be applied. The machine illustrated in FIG. 1 is of a type that allows credit input by insertion of coins or bills but the invention can also be applied to machines that only allow credit input by transfer of credit from a central cashier or from another gaming machine. In FIG. 1, reference numeral 10 generally designates a gaming machine, including a game or games to be played by a player of the machine. The machine 10 includes a console 12 having a display means in the form of a video display unit 14 on which a game 16 is played. The video display unit 14 may be implemented as a cathode ray screen device, a liquid crystal display, a plasma screen, or the like. The game 16 as illustrated in FIG. 1 is a spinning reel game which simulates the rotation of a number of spinning reels 18, however many other styles of game are also possible.

Figure 2:
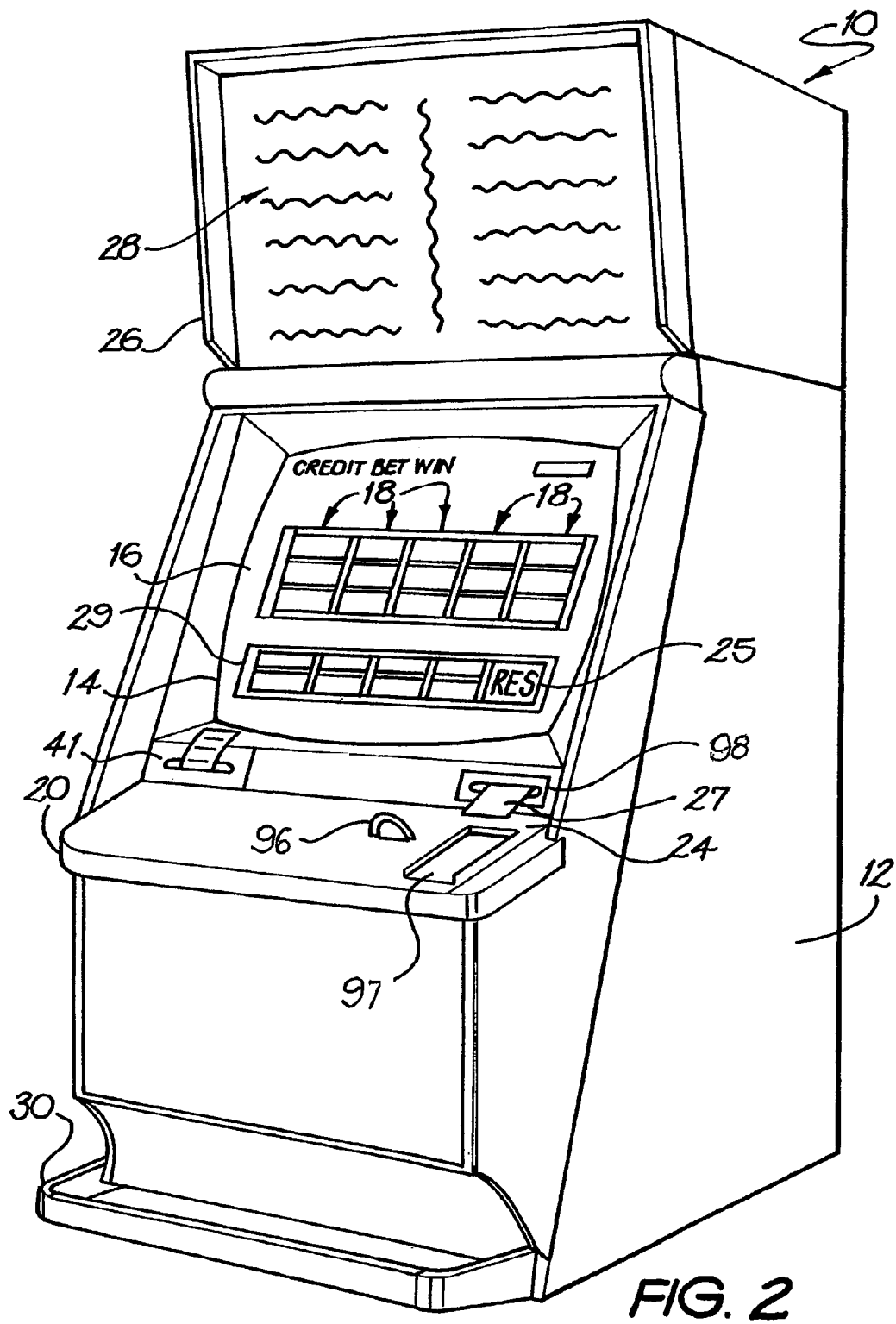
FIG. 2 shows a perspective view of a second style of gaming machine, suitable for use in systems implementing embodiments of the present invention.

A mid-trim 20 of the machine 10 optionally houses a keypad 22 for enabling a player to play the game 16. The mid-trim 20 also houses a credit input mechanism 24 including a coin input chute 96 and a bill collector 97. As illustrated in FIG. 2, some gaming machines use a touch screen for player input, in which case the keypad 22 would not be required on the mid-trim in those machines. Instead the keys of the keypad 22 of the FIG. 1 machine would be represented as a graphic image 29 on the screen 16 and touch sensors 38 (refer to FIG. 3) located adjacent the screen surface would detect touching of the screen to record player selections. In all other respects the machines of FIGS. 1 and 2 are essentially functionally identical.

The machine 10 of FIGS. 1 and 2 includes a top box 26 on which artwork 28 is carried. The artwork 28 includes paytables, details of bonus awards, etc. The artwork 28 in the top box 26 may optionally be displayed on a video display such as a CRT of LCD panel.

A coin tray 30 is mounted beneath the console 12 for cash payouts from the machine 10.

In machines employing the present invention the machine may also be connected via a computer network to other gaming machines and a system controller in which case player profiles may be saved on the system controller and credits can be applied to and cleared from the machine via the network. The credits can either be established at a cashiers station and transferred to the machine or alternatively a player might already have credits in another machine in the network and which they may wish to transfer to a new machine that they wish to play.

To facilitate the establishment of player profiles, the use of player profiles to enhance player enjoyment and to enable the secure transfer of cash to a machine, each machine is provided with a card reader 98 and the player is issued with a player tracking card 27 either when entering the premises or when establishing credit in the system. This tracking card 27 is inserted into the card reader 98 of a machine by the player after the player has established a credit on the system and has had the credit transferred to the desired machine. Alternatively the card may be a membership card permanently in the possession of the player and the player may establish a credit in an account associated with their membership record. By inserting the card 27 into the card reader 98 of the machine he or she intends to play, the player identifies him or herself to the machine and establishes that a credit held in the system belongs to them. In the illustrated embodiment, the card reader 98 is not connected directly to the machine's controller 36 but to the system interface 51, which is connected to the network via interconnection 52 and to the machine controller 36 as seen in FIG. 3.

Figure 3:
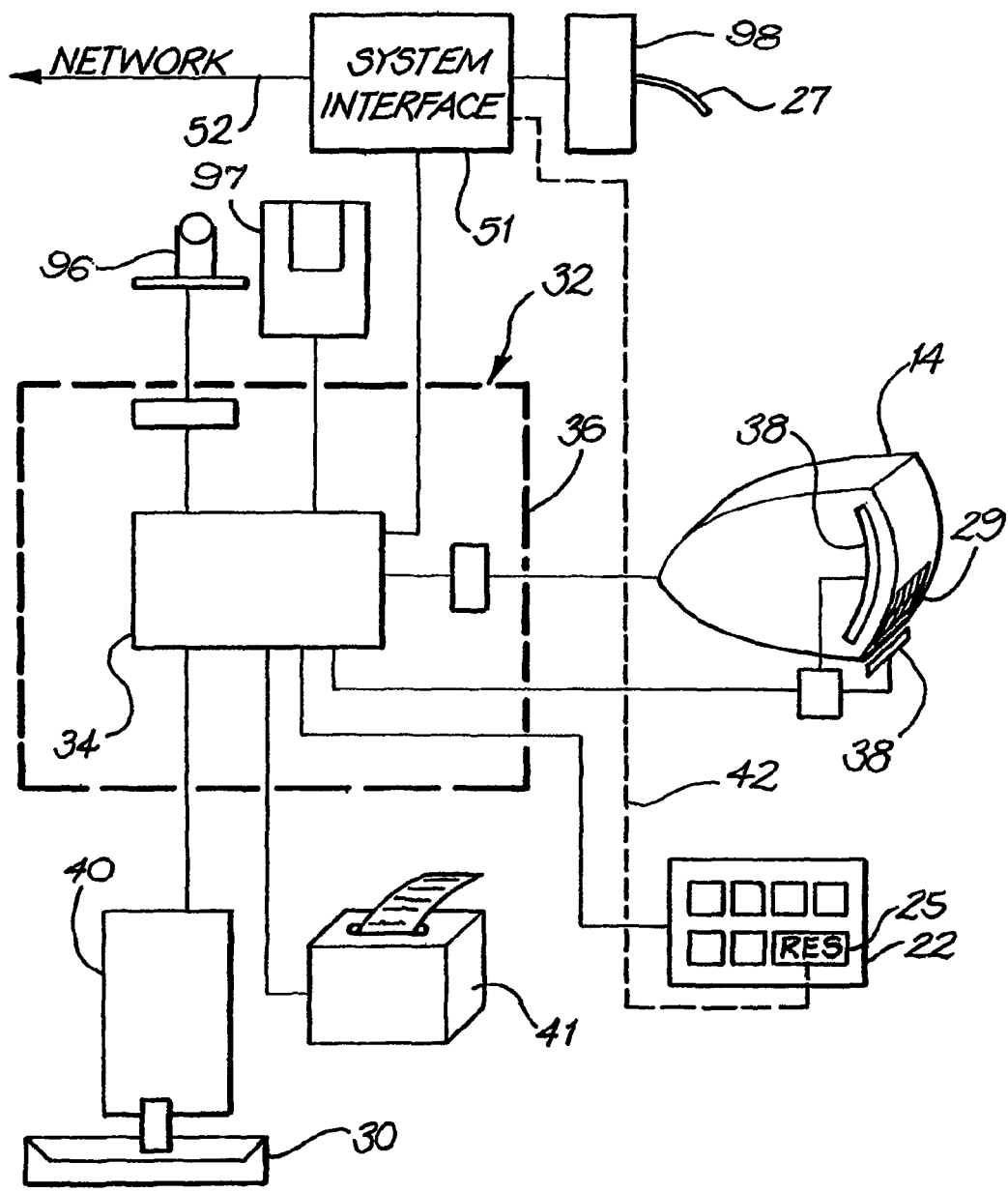
FIG. 3 shows a block diagram of a control circuit of the gaming machines of FIGS. 1 and 2.

Referring to FIG. 3 of the drawings, a control means or control circuit 32 is illustrated. A program which implements the game and player interface is run on a processor 34 of the control circuit 32. The processor 34 forms part of a controller 36 that drives the screen of the video display unit 14 and that receives input signals from player inputs such as the optional keypad 22 (see FIG. 1) or the optional sensors 38 associated with the pseudo-keypad 29 (see FIG. 2). The sensors 38, if used, include touch sensors mounted in the screen of the video display unit 14 and associated with the representation of pseudo-buttons of the keypad 29, displayed on the display 16, thereby replicating the buttons of the keypad 22. The controller 36 also receives input pulses from the mechanism 24 to determine whether or not a player has provided sufficient credit to commence playing. The credit input mechanism 24 may comprise one or more of several credit input devices such as a coin input chute 96a bill collector 97, and a card reader 98 or any suitable other type of validation device. In some embodiments of the present invention it is important that there be a player tracking input device, such as the card reader 24.3, that can be used to associate a particular player with a particular player profile and optionally a credit held in the system (either as data held in a machine or in the system controller or possibly in a further controller reserved for financial information). Note that player tracking does not require knowing the actual identity of the player but is only used to associate the player with a particular player profile and/or credit. This is achieved in the preferred embodiment by using a player tracking card 27, which is a simple magnetic stripe card encoded with a unique code, that may be issued to the player either when they enter the establishment or when establishment or when they establish a credit in the system and is read by the card reader 24.3. However other methods of player identification can be employed in tracking systems such as pin numbers, scannable tags of various known types such as magnetic stripe cards, smart cards, etc, iris recognition, finger prints or other bio-sensor systems.

Finally, the controller 36 optionally drives a payout mechanism which, for example, may be ticket printer 41, or a coin hopper 40 for feeding coins to the coin tray 30 to make a pay out to a player when the player wishes to redeem his or her credit. Again however, in embodiments of the present invention, a payout mechanism is not essential as the player may remove the credit held in the machine by transferring it to another machine or to a cashier.

Figure 4:
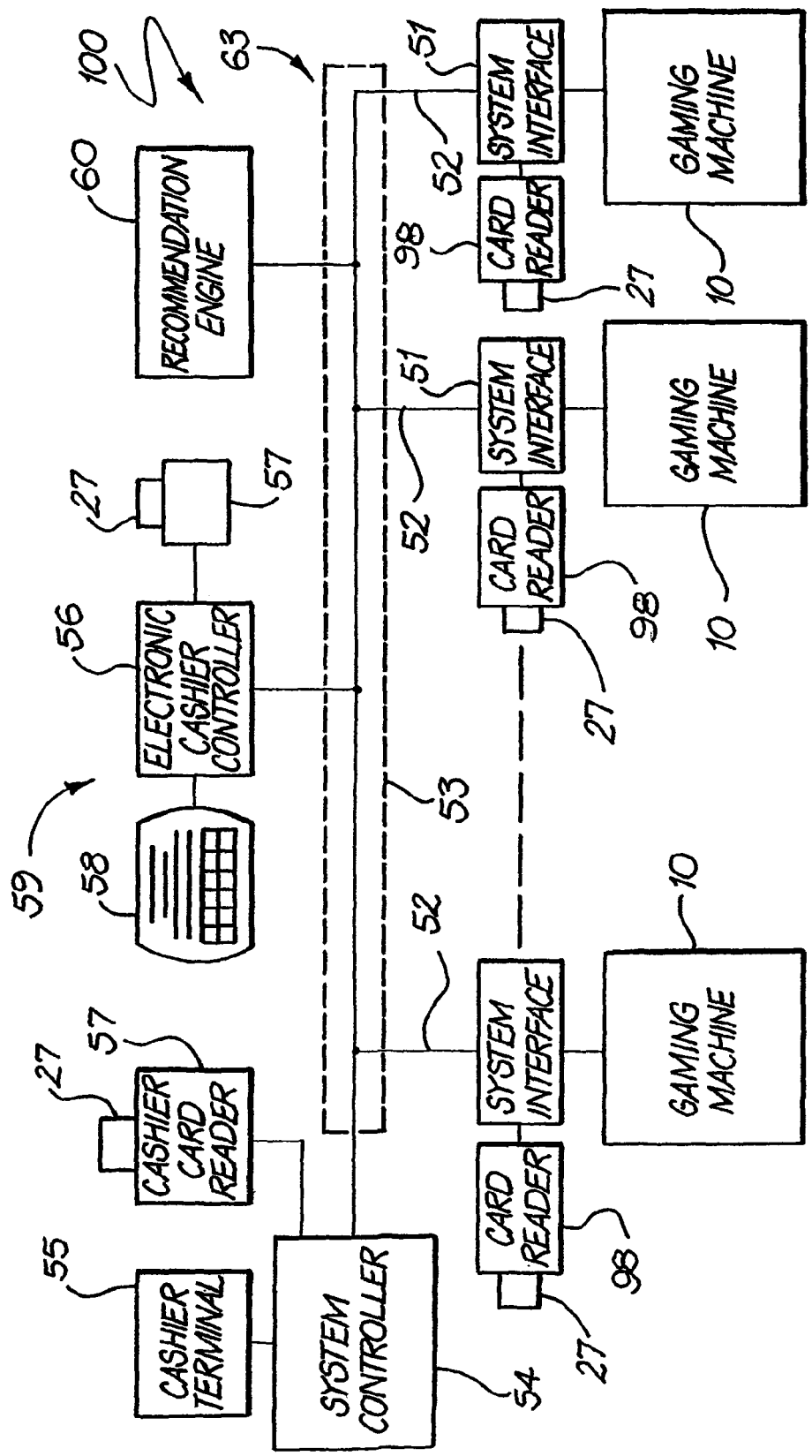
FIG. 4 shows a block diagram of a system implementing an embodiment of the present invention.

Referring to FIG. 4, a system in which the present invention is implemented is illustrated. The system comprises a plurality of gaming machines 10 each connected to a network 63 by its respective system interface 51 and network connection 52. The network connections 52 are preferably connected to the remainder of the network via a hub 53 although other networking architectures such as daisy chaining may also be employed. Controlling the network is a system controller 54 and a cashier's terminal 55 is optionally connected, either to the system controller 54 directly, as illustrated in FIG. 4, or alternatively via the network hub 53. The Cashier may be replaced or supplemented by an electronic cashier or cash in/cash out terminal 59 comprising a controller 56 to which is connected a player touch screen 58 and a card reader 57. The electronic cashier uses EFT transactions to debit or credit a player's account at a financial institution to establish or refund a player's credit in the gaming system.

While embodiments of the invention will be described by way of example in the context of the conventional gaming machine and gaming system described above, it will be recognised that the invention is equally applicable to other gaming environments such as internet gaming where games are played on a personal computer (or, possibly a hand held device such as a Personal Digital Assistant (PDA) or Mobile Phone) connected to an internet gaming website, or a stand alone hand held device or any other suitable gaming environment.

Referring to FIG. 4, in the preferred implementation a network connects EGMs to a server. In the traditional manner the server tracks players by their use of a magnetic player tracking or identity card and collects statistics about the games played.

The lists of games available to the player may be very large, such that it is difficult for the player to page through large number of game selection screens to find games that they like.

The game play history for all players is analysed by a recommendation engine 60, which given a particular players game playing history produces a list of other recommended games that the player might enjoy playing based on the play history of other players. The list of recommendations is used to determine the presentation of the next available games to the player.

When the player wants to choose a new game to play the EGM ranks the unplayed games according to the recommendation and preferentially displays the most highly recommended games to the player. For example, if the gaming machine has 100 games available to play, and games are presented 10 at a time on 10 selection screens, then the first selection screen contains the 10 most highly recommended games. The next selection screen presents the 10 next most highly recommended games, etc, until the last screen has the least recommended games.

Figure 5:
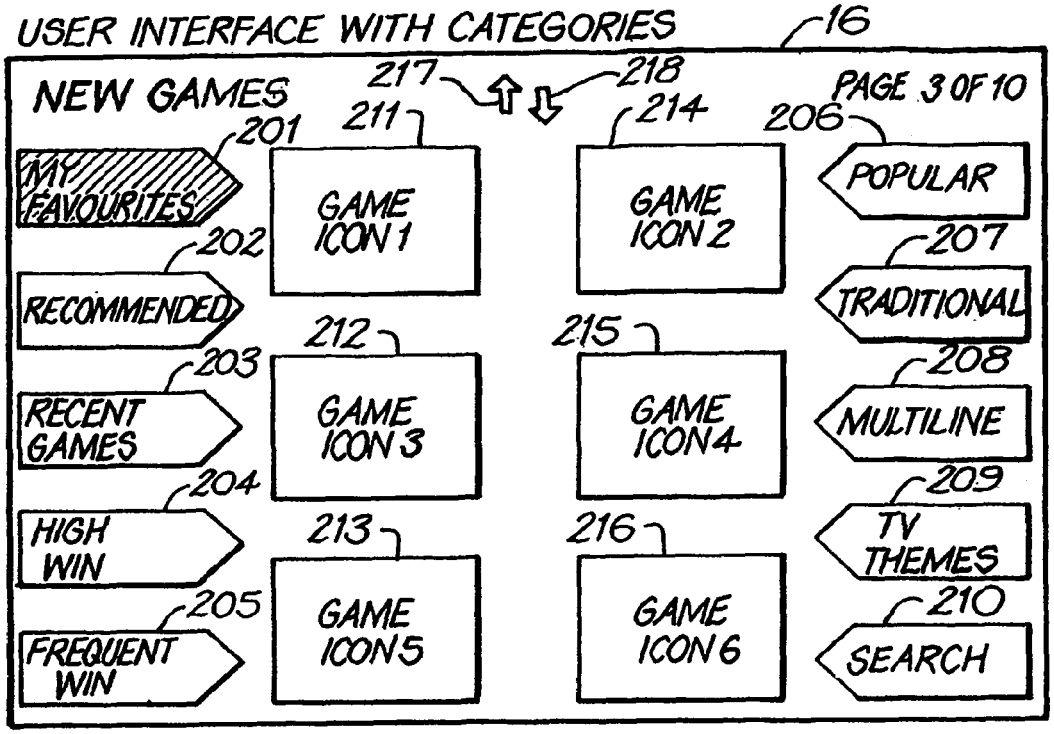
FIG. 5 shows a first screen layout used in embodiments of the present invention.

Of course the player may not want to accept a list of recommendations and may rather select a game on other criteria such as game type or prize distribution. Referring to FIG. 5, in order to accommodate the various differing player requirements, the total list of games is preferably split into a number of categories according to common player preferences and presented to the player in a selection window 16 as illustrated. Such categories may include games with high wins, games with frequent wins, older (traditional) games, card games, slot games, and currently popular games. The same game may appear in more than one category. In the screen 16, illustrated in FIG. 5, games are grouped according to categories selected by touch screen "buttons" 201 to 210 and the game icons 211 to 216 displayed in the centre of the screen 16 represent the games belonging to the currently selected category or a subset of the games belonging to the selected category. One of the categories, represented by the "Recommend" "button" 202, provides the set of recommended games, generated by the recommendation system as described herein.

Within each category the games may be further ordered, either with sub-categories. If the selected games exceed the space available for display of their respective icons, multiple pages will be provided and the player may move through the pages using page buttons 217 and 218.

Figure 6:
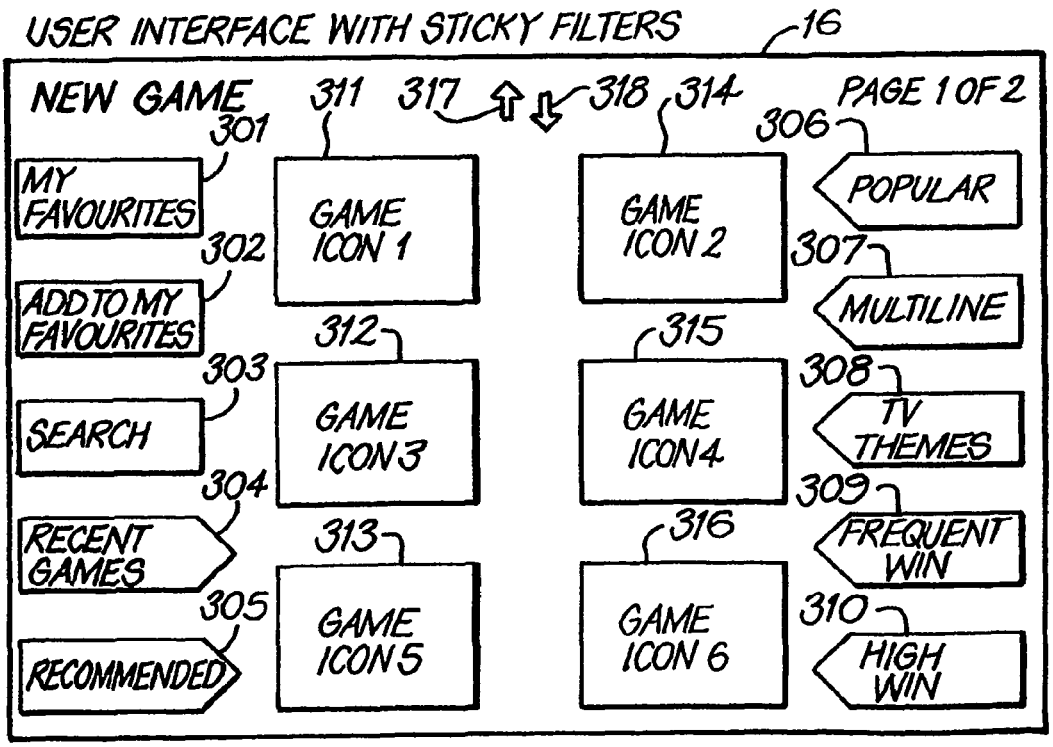
FIG. 6 shows a variation of the screen of FIG. 5 used in embodiments of the present invention.

Referring to FIG. 6, alternatively the list of game icons 311 to 316 displayed for selection by the player are generated according to a set of filters. Each game is assigned one or more tags indicating certain attributes (corresponding to categories) of the game, and the tag is used by the filter to select the game (or not) for inclusion on the displayed games list. For example a game may be 'high win' and 'popular'. If the player selects either (or both) 'high win' and 'popular' filters then, by touching the corresponding filter "button" 301 to 310, this game will appear in the selection. If another filter, such as frequent win, is selected the game will not appear in the selection list as it does not have a frequent win tag. Preferably the filters are toggled on or off by selecting the respective filter "button" 301 to 310. Some filters may disable other filters when selected, if the filters are mutually exclusive. The "high wins" and "frequent wins" filters are, for example, likely to be mutually exclusive as it is not possible to design a game with frequent high wins (within the usual meaning of these terms within the gaming industry) without returning to the player more money than they bet. Note that the player may simultaneously select multiple filters as illustrated by the grey buttons in FIG. 6, in which case only games that are associated with all of the selected categories will be displayed. If the selected games exceed the space available for display of their respective icons, multiple pages will be provided and the player may move through the pages using page buttons 317 and 318.

In an further preferred embodiment, the number of categories displayed to the player is a subset of those available, and the categories displayed can be selected by the player from the total set. Alternately the categories are dynamically selected by the gaming machine and/or system according to players playing history. Preferably also, some of the categories are selected using the recommendation technique described herein.

The categories of games and/or games in each category may be changed dynamically, either manually or according to pre-programmed criteria such as time of day or number gaming machines in play. The command to change the games may be initiated from within the gaming machine or remotely from network control system.

When the "recommended" category is selected, the games selection player interface may only be partially influenced by the recommendations. For example, the player's favourite games may be presented as well as the top choices from the recommendation list. The casino may also wish to override some of the recommendations to promote other games.

As games have a limited lifespan the age of the game being played is recorded and used in making recommendations. Some players have preferences for games of different age (eg some players prefer new games, some prefer older games).

Numerous variations on this implementation are clearly possible:

- The recommendation engine may be provided by software running either on one of the existing servers used for accounting, bonusing, etc, or on a separate recommendation server.
- The recommendation engine may also be part of the gaming machine. This can be beneficial if the gaming machine is not networked, or if there is a need to offload processing from the system for cost or performance reasons. If the recommendation engine is implemented on the gaming machine, then the gaming machine will contain a database of previously collected player statistics (either for that machine only or collected from other machines in the establishment) to enable recommendations to be generated.
- Instead of player tracking with a magnetic stripe identity card, a Smartcard may be used. Further, player history could be stored on this card, providing easy transportation of the data to other casinos.

Overview of Game Recommendation Function

The gaming machines in installations employing embodiments of the present invention provide functionality that allows players to search for and select games to play from a library of possibly hundreds of games stored on the system or the individual gaming machine. While the player plays gaming machines on the system a tracking system records the games played and the frequency of playing each game. The tracking system includes a data structure and associated code which keeps track of games that have been selected and played by a player for play and this information is then used to provide recommendations for future game selections of the current player and as a basis for recommendations to others.

The system also implements a variety of different auxiliary recommendation function for recommending games to players.

One such function allows players to interactively rate individual games to create a personal game ratings profile, and applies collaborative filtering techniques to each of these profiles to generate personal recommendations.

The primary function of the recommendation engine is to recommend games to players currently playing on the system, but it could also be used in the context of a website to make game recommendations to a player before they attend a gaming establishment or in the context of a recommendation terminal attached to the gaming network of an establishment to recommend games to a player already in attendance at the establishment but not currently playing. Such a terminal might also direct a player to a suitable vacant machine for playing a selected game. Briefly, given a unary listing of games that are "known" to be of interest to a player (e.g., a list of games previously played, by the player), the Recommendation Engine generates a list of additional games ("recommendations") that are predicted to be of interest to the player. (As used herein, the term "interest" refers generally to a player's liking of or affinity for an game; the term "known" is used to distinguish games for which the player has implicitly or explicitly indicated some level of interest from games predicted by the Recommendation Function to be of interest.)

A table is used to map games to lists of games having "similar affinity" for the player ("similar games lists"), without the player having to rate the games (although, as mentioned above, the use of ratings data is also envisaged). If a player is known to have shown interest in say, five games (such as five games the player recently played), the function may retrieve the similar games lists for these five games from the table, and appropriately combine these lists (as will be described below) to generate the recommendations.

The mappings of games to similar games ("game-to-game mappings") may be generated periodically, such as once per day (or more frequently), from data which reflects the collective interests of the community of players. More specifically, the game-to-game mappings may be generated by an off-line process which identifies correlations between known interests of players in particular games. For example, in the embodiment described in detail below, the mappings are generating by analysing player playing histories to identify correlations between use of particular games (e.g., games A and B are similar because a relatively large portion of the players that played game A also played game B). The game-to-game mappings could also reflect other types of similarities, including content-based similarities extracted by analysing game descriptions.

An important aspect of this embodiment of the Recommendation Function is that the relatively computation-intensive task of correlating game interests can optionally be performed off-line, and the results of this task (game-to-game mappings) are stored in a mapping structure for subsequent look-up. This enables the personal recommendations to be generated rapidly and efficiently in real-time in response to a request by the player, while still producing a broad varying comparison and not requiring intensive processing.

Optionally, the similar games lists read from the table are appropriately weighted (prior to being combined) based on indicia of the player's affinity for or current interest in the corresponding games of known interest. For example, in one embodiment described below, if the game of known interest was previously rated by the player, the rating is used to weight the corresponding similar games list. Similarly, the similar games list for a game that was played 1000 times in the last hour may be weighted more heavily than the similar games list for a game that was played only 100 times in the past hour.

Embodiments of the invention may also make use of information regarding games that the player has played in the current playing session as inputs to the Recommendation Function. For example, if the player currently has two games that they have played today, these two games can be treated as the games of known interest for purposes of generating recommendations, in which case the recommendations may be generated and displayed automatically when the player views the game selection screen.

Using games played in the current playing sessions as inputs, tends to produce recommendations that are highly correlated to the current short-term interests of the player; even if these short term interests are not reflected by the player's long term gaming history. For example, if a regular player is currently playing with an occasional partner who has different game interests than the regular player, this method will have a tendency to identify other games that are well suited to the pair of players while they are playing together.

Figure 7:
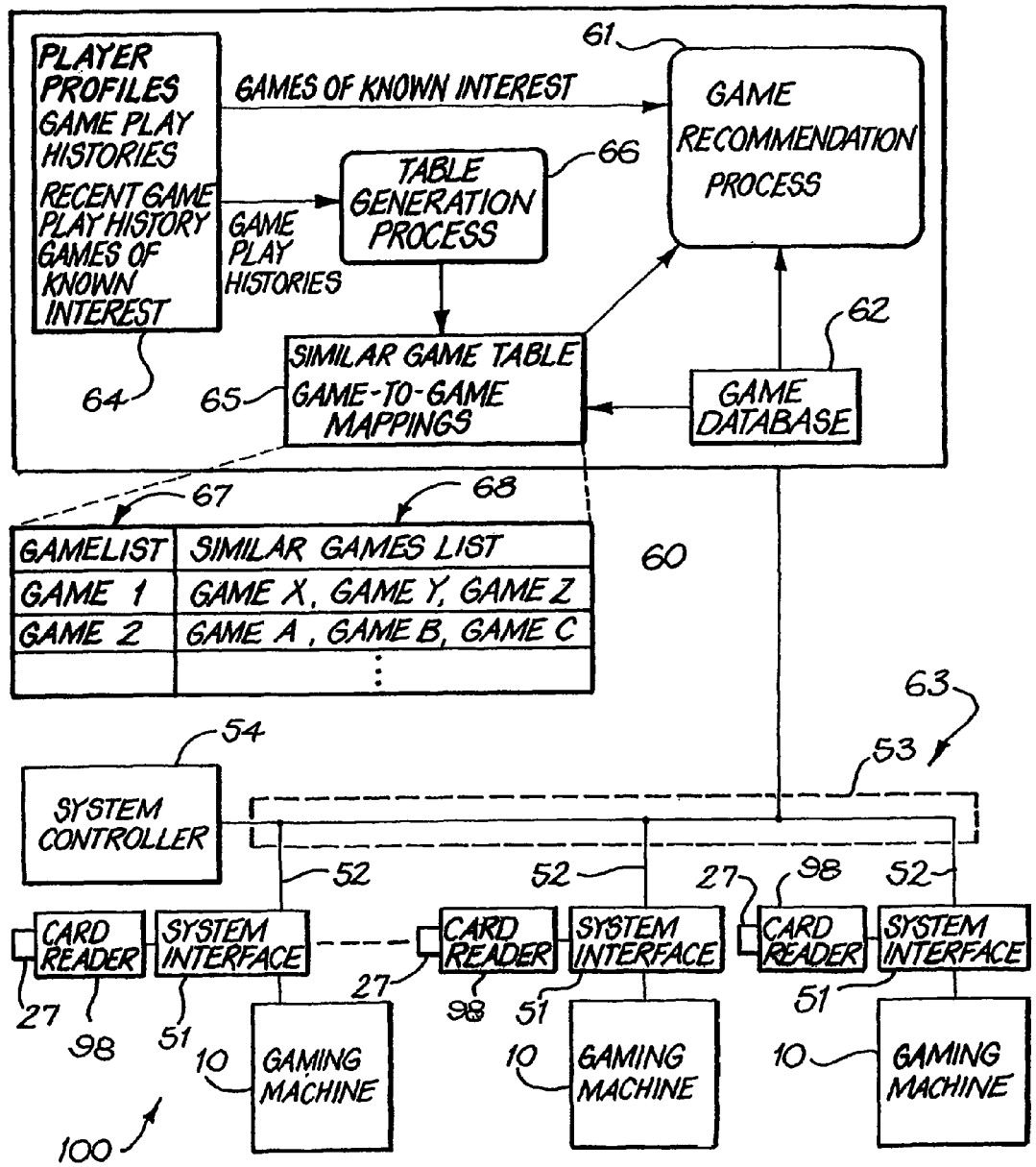
FIG. 7 is a block diagram of a system which embodies the present invention showing the recommendation engine in detail.

FIG. 7 illustrates the basic components of the gaming system site 100, including the components used to implement the Recommendation Server 60. The arrows in FIG. 7 show the general flow of information that is used by the Recommendation Function. As illustrated by FIG. 7, Recommendation Server 60 processes requests received from gaming machines 34 over the network 63 and send recommendation lists in reply. The Recommendation Server 60 accesses a Games Database 62 to generate lists of popular games and recommendation lists.

The Gaming System 100 also includes a "player profiles" database 64 which stores account-specific information about players' playing games on the system 100. Because a group of individuals can share an account by playing as a group, a given "player" from the perspective of the Recommendation Engine 60 may include multiple actual players. As illustrated by FIG. 7, the data stored for each player may include one or more of the following types of information (among other things) that can be used to generate recommendations in accordance with the invention: (a) the player's playing history, including dates of play, (b) the player's game ratings profile (if any), (c) the player's personal recent playing listings, and (d) a listing of games that were recently (e.g., within the last six months) selected and then exited again without being played, or after having only been played a few times.

The various processes 61, 66 of the recommendation server 60 may run, for example, on one or more Unix or NT based workstations or physical servers (not shown) of the Gaming System 100. The similar games table 65 is preferably stored as a B-tree data structure to permit efficient look-up, and may be replicated across multiple machines (together with the associated code of the Recommendation Process 61) to accommodate heavy loads.

The general form and content of the similar games table 65 will now be described with reference to FIG. 7. As this table can take on many alternative forms, the details of the table are intended to illustrate, and not limit, the scope of the invention.

As indicated above, the similar games table 65 maps a list of games ("reference games") 67 to lists of similar games 68 based at least upon the collective interests of the community of players. The similar games table 65 may be generated periodically (e.g., once per day), or may be continuously updated by the table generation process 66. If the table generating process 66 is run once per day, it will preferably be run off-line. The table generation process 66 generates the table 65 from data that reflects the collective interests of the community of players. In the embodiment described in detail herein, the similar games table is generated exclusively from the game playing histories of the community of players (as depicted in FIG. 7). In other embodiments, the table 65 may additionally or alternatively be generated from other indicia of player-game interests, including indicia based on players' viewing (browsing) activities, game playing histories, and game rating profiles. For example, the table 65 could be built exclusively from the long term and/or recent game playing histories of players. The similar games table 65 could also reflect non-collaborative type game similarities, including content-based similarities derived by comparing game or descriptions or structural game elements.

Each entry in the similar games table 65 is preferably in the form of a mapping of a list of all available games ("reference games list") 67 to a corresponding list 68 of similar games ("similar games lists").

Each similar games list 68 consists of the N (e.g., 5) games which, based on correlations between playing of games, are deemed to be the most closely related to the respective game 67. Each game in the similar games list 68 is stored together with a commonality index ("CI") value which indicates the relatedness of that game to the reference game 67, based on play frequency of the respective games. A relatively high commonality index for a pair of games Game J and Game K indicates that a relatively large percentage of players who played Game J also played Game K (and vice versa). A relatively low commonality index for Game J and Game K indicates that a relatively small percentage of the players who played Game J also played Game K (and vice versa). As described below, the similar games lists are generated, for each game available on the system, by selecting the N other games that have the highest commonality index values. Using this method, Game J may be included in Game K's similar games list even though Game K is not present in Game J's similar games list.

In the embodiment depicted by FIG. 7, the games are represented within the similar games table 65 using game IDs, such as game catalogue numbers or other identifiers. Alternatively, the games could be represented within the table by title, where each title is the name by which the game is known to players.

The general sequence of steps that are performed by the recommendation process 52 to generate a set of personal game recommendations will now be described with reference to FIG. 8.

Figure 8:
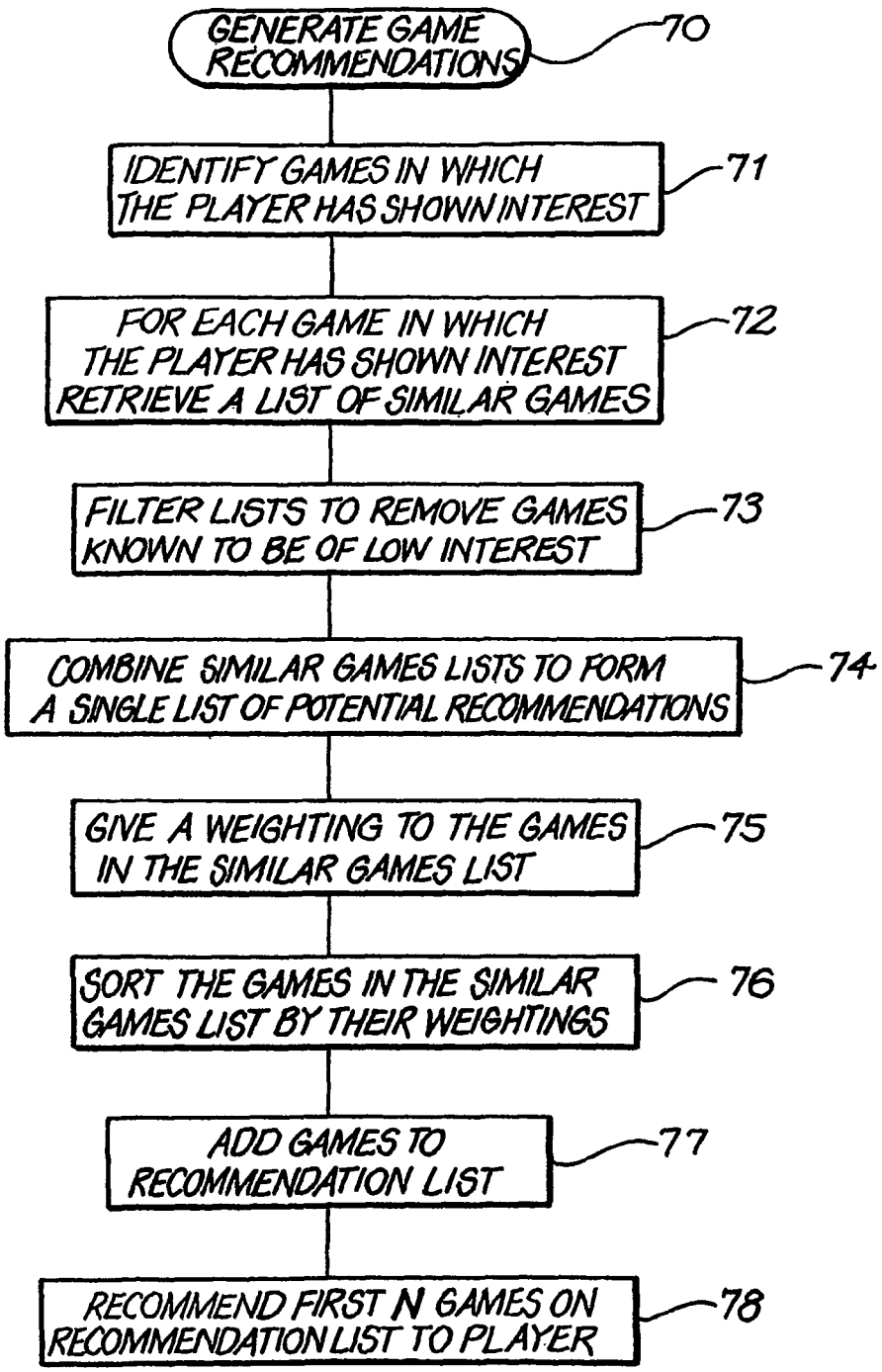
FIG. 8 is a flow chart of a recommendation process.

The FIG. 8 process 70 is invoked in real-time in response to an online action of the player. For example, the recommendations are generated and displayed in real-time (based on the player's play history and/or game ratings profile) in response to selection by the player of a new game instructions selection button 201-210 (See FIGS. 5 & 6). The recommendations are generated (based on the player's current and/or recent game playing history) in real-time when the player initiates a recommendation button 202, and are displayed on the gaming machine display screen 16 and are displayed on the same screen as icons 211-216.

Any of a variety of other methods can be used to initiate the recommendations generation process and to display the recommendations to the player. For example, the recommendations can automatically be generated periodically and sent to the player as a message on the screen between games. Further, the personal recommendations could be generated in advance of any request or action by the player, and cached until requested.

As illustrated by FIG. 8, the first step (step 71) of the recommendations-generation process involves identifying a set of games that are of known interest to the player. The "knowledge" of the player's interest can be based on explicit indications of interest (e.g., the player rated the game highly) or implicit indications of interest (e.g., the player selected the game and played it at least 5 times).

In the embodiment depicted in FIG. 7, the games of known interest are selected from one or more of the following groups: (a) games in the player's long term playing history; (b) games in the player's short term playing history i.e., the games played in the current session and, (c) games rated by the player (optionally with a score that exceeds a certain threshold. In other embodiments, the games of known interest may additionally or alternatively be selected based on the viewing activities of the player. For example, the recommendations process 52 could select games that were viewed by the player for an extended period of time and/or viewed more than once. Further, the player could be prompted to select games of interest from a list of popular games.

For each game of known interest, the recommendation function 61 retrieves the corresponding similar games list 68 from the similar games table 65 (step 72), if such a list exists. If no entries exist in the table 65 for any of the games of known interest, the process 52 may be terminated; alternatively, the process could attempt to identify additional games of interest, such as by accessing other sources of interest information.

In step 73, the similar games lists are filtered to remove unwanted games. The games removed during the filtering process may include, for example, games that have already been played only a small number of times and then not played again by the player or games that have been rated lowly by the player. The filtering step could alternatively be performed at a different stage of the process, such as after the subsequent combining step After the similar games lists 68 are filtered in step 73, the lists are appropriately combined (step 74), such as by merging the lists. The similar games lists 68 are then preferably weighted 75 by multiplying the commonality index values of the list by a weighting value. The commonality index values as weighted by any applicable weighting value are referred to herein as "scores". In other embodiments, the recommendations may be generated without weighting the similar games lists 68. The resulting list is then sorted (step 76) in order of highest-to-lowest score. The result of step 76 is a list ("recommendations list") of games to be recommended to the player.

In step 75, the similar games lists 68 are optionally weighted based on information about the player's affinity for the corresponding games of known interest. For example, a similar games list 68 may be weighted heavily if the player gave the corresponding popular game a rating of "5" on a scale or 1-5, or if the player the game for a large number of plays. Weighting a similar games list 68 heavily has the effect of increasing the likelihood that the games in that list we be included in the recommendations that are ultimately presented to the player. In one implementation described below, the player is presumed to have a greater affinity for recently played games over earlier played games.

In step 77, one or more additional games are optionally added to the recommendations list. In one embodiment, the games added in step 77 are selected from the set of games (if any) in the player's viewing history. As an important benefit of this step, the recommendations include one or more games that the player previously considered playing but did not actually play. The games added in step 77 may additionally or alternatively be selected using another recommendations method, such as a content-based method.

Finally, in step 78, a list of the top M (e.g., 6) games of the recommendations list are returned to the gaming machine where the request was generated. The gaming machine incorporates this list into one or more screens of recommendations that are displayed to the player, with each recommended game being presented as displayed selection icon on the display.

The table-generation process 66 is preferably executed periodically (e.g., once a day) to generate a similar games table 65 that reflects the most recent play history data. The recommendation process 61 uses the most recently generated version of the table 65 to generate recommendations.

Figure 9:
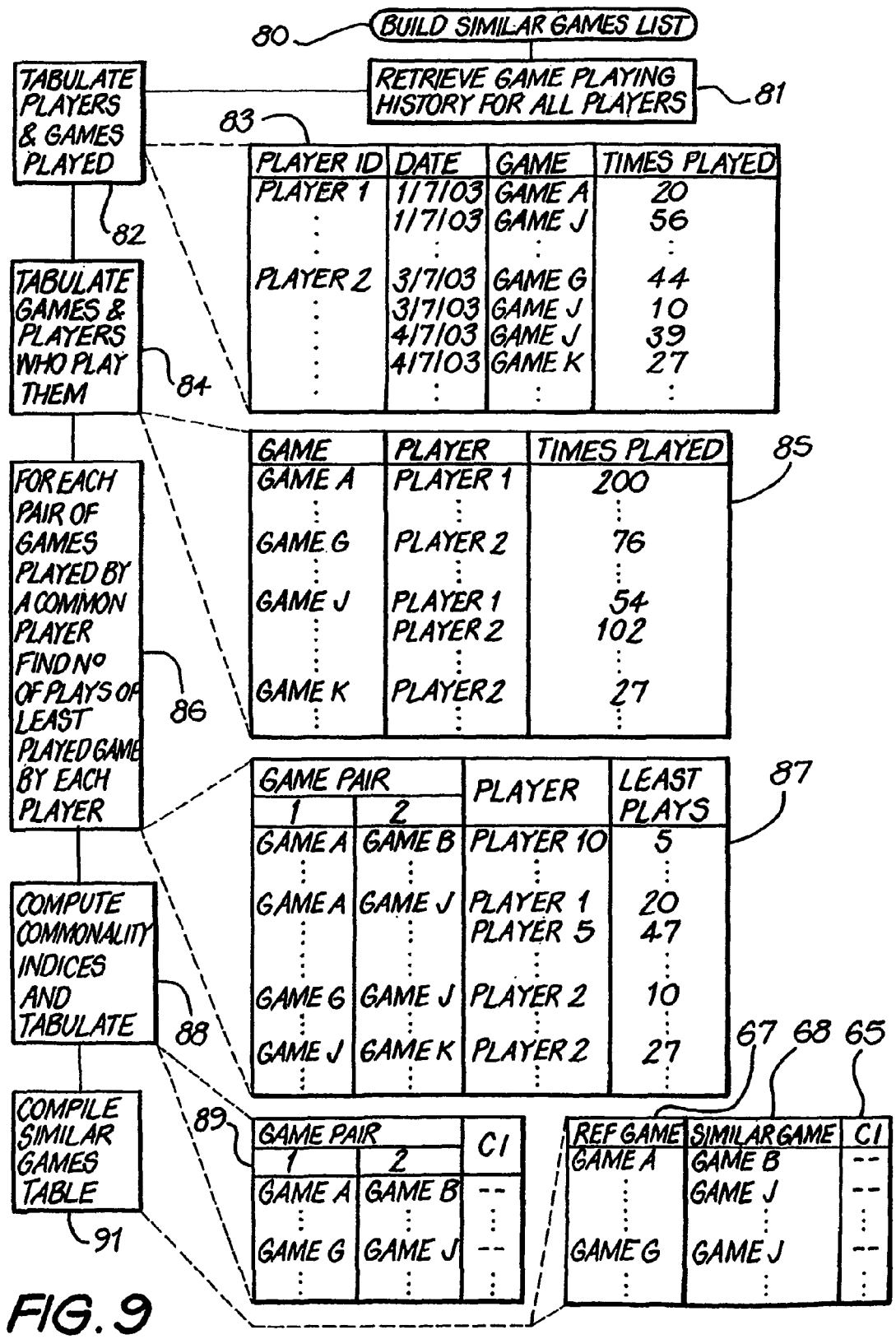
FIG. 9 is a flow chart of a process for building a similar games table.

FIG. 9 illustrates the sequence of steps that are performed by the table generation process 66 to build the similar games table 65. The general form of temporary data structures that are generated during the process are shown at the right of the drawing. As will be appreciated by those skilled in the art, any of a variety of alternative methods could be used to generate the table 65.

As depicted by FIG. 9, the process initially retrieves the gaming histories for all players (step 81). Each gaming history is in the general form of the player ID of a player together with a list of the game IDs of the games played by that player and the dates on which the player has played the games and the number of times the game was played on each occasion.

In steps 82 and 84, the process generates two temporary tables 83 and 85. The first table 83 maps individual players to the games they played and includes dates and times played. The second table 85 maps games to the players that played such games and again includes the total times played (within a relevant period of interest).

In step 86, the process finds for each game in the system ("reference game") those other games played by a common player, and lists the players and games against the "reference game" in a further temporary table 87. This may be accomplished, for example, by selecting from the game-to-players table 85 those games that were played by more than a threshold number (e.g., 10) of the players. For each <reference game, other game> pair/player combination, the number of plays of the game played least by the player is also listed.

In step 88, the process generates the commonality indexes (CI) for each <reference game, other game> pair in the table 87. As indicated above, the CI values are measures of the similarity between two games, with larger CI values indicating greater degrees of similarity. The commonality indexes are preferably generated such that, for a given reference game, the respective commonality indexes of the corresponding other games take into consideration both (a) the total number of plays of each game in the respective period, and (b) the number of times each player played the least popular of each pair of games. A preferred method for generating the commonality index values is set forth in the equation below (Eqn 1).

$$CI \text{ (Game } A, \text{ Game } B) = \frac{\sum X \text{ for all players of games } A \& B}{Sqrt \ (Y \times Z)} \quad (1)$$

where, for each player who has played Game A and Game B in a given period, "X" is the number of plays of the least played game (A or B), "Y" is the total number of plays of Game A and "Z" is the total number of plays of Game B in the period By way of example, foe three games, Game_G, Game_J and Game_K where Game_G has been played 40,000 times by 500 players, Game_J 90000 by 500 players, and Game_K 100,000 by 5,000 players. In addition, Game_G and Game_J have 50 players in common, and Game_G and Game K have 60 players in common. ΣX for games G and J is 2500 and ΣX for games G and K is 960. Applying the equation above to the values shown in FIG. 4 produces the following results:

CI(Game_G, Game_J)=2500/sqrt(40000.times.90000))= 0.042

CI(Game_G, Game K)=960/sqrt(90000.times.100,000))= 0.010

Thus, even though Games G and K have more customers in common than Games G and J, Games G and J are treated as being more similar than Games G and K. This result desirably reflects the fact that for Game J players who played Game_G the number of plays of both games is much greater than for Game K players who played Game_G.

Because this equation is symmetrical (i.e., CI(Game_A, Game_B)=CI(Game_B, Game A)), it is not necessary to separately calculate the CI value for every location in the table 89.

Following step 88 of FIG. 9, the similar games table 65 can be complied (step 91) such that each reference game in the reference game list 67 has a respective set of other games in the "other games" list 68 which includes all of the other games from the table 89 and their associated CI values Using the values in the example above, Game_J would be positioned closer to the top of the Game G's list than Game K, since 0.042>0.010. Optionally (not shown), the other games list is filtered by deleting all list entries that have fewer than a predetermined number of (say 10) players in common.

A non-gaming machine terminal may also be used to allow the player to get recommendations for new games to play. This could be implemented at a casino or as an Internet website and may allow a player to input various likes (and dislikes) for games, then use the recommendation engine to recommend games.

Promotions and Advertising

Casinos often run promotions, posting advertising literature to the players to entice them to return to the casino for further play. A marketing promotion may use the players' previously collected play information and use the recommendation engine to customise promotions to that player. For example the artwork of advertising material may be selected from games that have not yet been played, but are likely to appeal to the player. Alternately free credits may be provided for machines that the player has not yet played, but is likely to enjoy playing.

Attract Mode

When a gaming machine is not being played after some time it enters an "attract" mode, where it demonstrates the game it runs. A multi-game machine is able to demonstrate any of it's games, so it is beneficial to demonstrate a game more likely to appeal to a nearby potential player.

There are cases when a potential player may be identified.

1. A potential player has inserted an identity card, but not yet selected a game or started playing.
2. A player is playing the gaming machine next to the unplayed gaming machine. The player can easily watch the unplayed machine and may either find a new game to play, or play both at the same time (especially in the case of a couple of people playing together).

When at least some of the players in the casino have been identified (eg though play machines), their average preference is determined and used. Although not as accurate as targeting an individual player, this has the advantage of continuously and automatically adjusting the presentation of machines in the casino to optimum benefit.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method, comprising:
presenting a plurality of game list options via a display of a gaming machine configured to provide a plurality of games that each award a prize upon obtaining a winning result;
determining whether a player at the gaming machine has selected a recommended games list option from the plurality of game list options;
reading a player tracking card of the player via a card reader of the gaming machine to identify the player and a player profile associated with the player;
in response to determining that the player has selected the recommended games list option, generating a recommended list of games for the player based on a playing history of the player obtained from the player profile associated with the player and playing histories of other players for the plurality of games provided by the gaming machine; and
presenting the recommended list of games via the display of the gaming machine.

2. The method of claim 1, wherein said generating a recommended list of games for the player comprises selecting games based on playing histories of the player and other players for games provided by the gaming machine and games not provided by the gaming machine.

3. The method of claim 1, wherein said generating a recommended list of games for the player comprises selecting games based on play during a current playing session of the player and play during a previous playing session of the player.

4. The method of claim 1, wherein said generating a recommended list of games for the player comprises:
identifying a plurality of games in which the player has shown interest;
retrieving a plurality of similar games lists based upon the plurality of games in which the player has shown interest, wherein each similar games list identifies games that are similar to a game in which the player has shown interest; and
populating the recommended list of games for the player with games selected from the plurality of similar games lists.

5. The method of claim 1, further comprising:
determining whether the player has selected a game category from the plurality of game list options; and
in response to determining that the player has selected a game category from the plurality of game list options, presenting via the display a list of games that belong to the selected game category.

6. The method of claim 1, further comprising:
assigning one or more tags to each of the plurality of games;
determining whether the player has selected one or more game filters from the plurality of game list options;
filtering the plurality of games based upon one more selected game filters to obtain a filtered list of games; and
presenting the filtered list of games via the display.

7. A computer-readable medium, comprising a plurality of instructions that, in response to being executed by a gaming machine configured to provide a plurality of games that each award the player a prize upon obtaining a winning result, results in the gaming machine:
presenting a plurality of game list options via a display of the game machine;
determining whether a player at the gaming machine has selected a recommended games list option from the plurality of game list options;
reading a player tracking card of the player via a card reader of the gaming machine to identify the player and a player profile associated with the player;
in response to determining that the player has selected the recommended games list option, generating a recommended list of games for the player based on a playing history of the player obtained from the player profile associated with the player and playing histories of other players for the plurality of games provided by the gaming machine; and
presenting the recommended list of games via the display of the gaming machine.

8. The computer readable medium of claim 7, wherein the plurality of instructions further result in the gaming machine selecting games for the recommended list of games based on playing histories of the player and other players for games provided by the gaming machine and games not provided by the gaming machine.

9. The computer readable medium of claim 7, wherein the plurality of instructions further result in the gaming machine selecting games based on play during a current playing session of the player and play during a previous playing session of the player.

10. The computer readable medium of claim 7, wherein the plurality of instructions further result in the gaming machine:
identifying a plurality of games in which the player has shown interest;
retrieving a plurality of similar games lists based upon the plurality of games in which the player has shown interest, wherein each similar games list identifies games that are similar to a game in which the player has shown interest; and
populating the recommended list of games for the player with games selected from the plurality of similar games lists.

11. The computer readable medium of claim 7, wherein the plurality of instructions further result in the gaming machine:
determining whether the player has selected a game category from the plurality of game list options; and
in response to determining that the player has selected a game category from the plurality of game list options, presenting via the display a list of games that belong to the selected game category.

12. The computer readable medium of claim 7, wherein the plurality of instructions further result in the gaming machine:
assigning one or more tags to each of the plurality of games;
determining whether the player has selected one or more game filters from the plurality of game list options;
filtering the plurality of games based upon one more selected game filters to obtain a filtered list of games; and
presenting the filtered list of games via the display.

13. A method, comprising:
collecting a plurality of player histories for a plurality of players via a plurality of gaming machines that are each configured to provide a plurality of games that award prizes in response to winning results;
presenting a plurality of game list options via a display of a gaming machine of the plurality of gaming machines;
determining whether a player at the gaming machine has selected a recommended games list option from the plurality of game list options;

reading a player tracking card of the player via a card reader of the gaming machine to identify the player and a player profile associated with the player;

in response to determining that the player has selected the recommended games list option, generating a recommended list of games for the player based on a playing history of the player obtained from the player profile associated with the player and playing histories other players for the plurality of games provided by the gaming machine; and demonstrating one or more games from the recommended list of games on a display of the gaming machine.

14. The method of claim 13, wherein said generating a recommended list of games for the player comprises selecting games based on playing histories of the player and other players for games provided by the plurality of gaming machines.

15. The method of claim 13, wherein said generating a recommended list of games for the player comprises:

identifying a plurality of games in which the player has shown interest;

retrieving a plurality of similar games lists based upon the plurality of games in which the player has shown interest, wherein each similar games list identifies games that are similar to a game in which the player has shown interest; and populating the recommended list of games for the player with games selected from the plurality of similar games lists.

16. The method of claim 15, wherein said populating the recommended list of games for the player comprises:

combining the plurality of similar games lists into a potential recommendations list comprising games of the plurality of similar games lists; and selecting a subset of the games from the potential recommendations list for the recommended list of games for the player.

17. The method of claim 15, wherein said populating the recommended list of games for the player comprises:

combining the plurality of similar games lists into a potential recommendations list comprising games of the plurality of similar games lists; and selecting a subset of the games from the potential recommendations list for the recommended list of games for the player based on a score associated with each game of the potential recommendations list, wherein each score accounts for similarities between games and determined affinity of the player toward games of the plurality of games.

18. The method of claim 13, further comprising:

determining whether the player has selected a game category from the plurality of game list options; and in response to determining that the player has selected a game category from the plurality of game list options, presenting via the display a list of games that belong to the selected game category.

19. The method of claim 13, further comprising:

assigning one or more tags to each of the plurality of games;

determining whether the player has selected one or more game filters from the plurality of game list options;

filtering the plurality of games based upon one more selected game filters to obtain a filtered list of games; and presenting the filtered list of games via the display.

* * * * *